Patented July 17, 1934

UNITED STATES PATENT OFFICE 1,967,189

PREPARATION OF ACETIC ACID

Ralph Lyman Brown, Syracuse, N. Y., assignor to Atmospheric Nitrogen Corporation, New York, N. Y., a corporation of New York No Drawing. Application June 20, 1931, Serial No. 545,849. Renewed November 24, 1933

14 Claims. (Cl. 260—116)

This invention relates to the synthetic production of acetic acid and its derivatives by catalysis, and more particularly to a manner in which the activity of the catalyst may be enhanced.

An object of the invention is to provide a procedure in connection with the catalytic production of acetic acid from a reaction mixture containing carbon monoxide and methanol for maintaining the activity of the catalyst and for prolonging the life thereof.

Another object of the invention is to provide a procedure in accordance with which the surface of the catalyst used in acetic acid synthesis may be renewed and regenerated in a continuous manner.

In the production of acetic acid by the reaction of a mixture containing carbon monoxide and methanol in the presence of a catalyst, there ensues a decrease in activity due to side reactions, which yield carbonaceous material depositing upon the catalyst, and to a change in composition of the catalyst or surface layer thereof.

I have found that the activity of the catalyst may be maintained and the life thereof prolonged by introducing a small amount of phosphoric acid into the reaction mixture passing over the catalyst.

In the practice of the invention acetic acid may be produced by reacting a mixture containing carbon monoxide and methanol in a suitable converter in the presence of a suitable catalyst, at an elevated temperature and pressure under desired conditions as to space velocity, ratio of reactants, etc., and introducing into the reaction mixture a small amount of phosphoric acid. The phosphoric acid may be continuously introduced into the converter along with, or in solution in the methanol passing to the reaction, or the phosphoric acid may be introduced into the system into direct contact with the catalyst mass by a small injector pump.

As an illustrative embodiment of a manner in which the invention may be carried out in practice, it will be described in connection with the use of the silica-phosphoric acid catalyst of copending application Serial No. 545,847.

A catalytic agent is prepared by mixing silica, silicic acid or silica gel with ortho phosphoric acid in proportions corresponding to silicyl meta phosphate $SiO(PO_3)_2$ heating at about 260° C. until the mass becomes semi-solid, continuing the heating at a temperature of about 500° C. and then crushing and screening the resulting solid to a size of about 6–8 mesh. The catalyst is charged into a silver-lined converter capable of withstanding high pressures and provided with the usual accessories for high pressure synthesis work. A reaction mixture consisting of carbon monoxide, methanol and a small amount of water vapor to which has been added an amount of phosphoric acid of from 0.005–0.03 mol. per mol. of methanol (and preferably .01–.02 mol. per mol. methanol at about 200 atmospheres) is passed over the catalyst at an elevated temperature and pressure which may be from about 350–450° C. and from about 100–300 atmospheres. The gases passing from the converter pass through a condenser and the acetic acid produced separated from the condensate in any suitable manner such as by distillation. The ratio of CO to methanol in the reaction gaseous mixture is from 10 to 2 mols. CO to 1 mol. methanol.

The practice of the invention, according to the foregoing description, effects the renewal or regeneration of the composition in the surface layer of the catalyst and prolongs the life and activity thereof.

It is believed that the effect of the addition of phosphoric acid to the catalyst during the synthetic production of acetic acid from a mixture containing carbon monoxide and methanol is to compensate for any change which may occur in the composition of the catalyst, particularly the surface layer thereof. The balance between the catalyst composition and the constituents of the gaseous mixture necessary to continuous operation with high yields is thereby maintained. There is also attained a substantial elimination of side reactions and removal from action of the carbonaceous material which is formed by the side reactions and deposits upon the catalyst, thereby decreasing its activity.

My invention is applicable to operations which do not involve the use of a silica catalyst composition, for example, a solid catalyst containing phosphoric acid in combined form such as calcium, chromium, thorium, zirconium, cerium and titanium phosphate.

I claim:—

1. A process which comprises reacting a mixture containing carbon monoxide and methanol in the presence of a catalyst, and introducing phosphoric acid into the reaction mixture in an amount of from 0.005–0.03 mol. per mol. of methanol.

2. A process which comprises reacting a mixture containing carbon monoxide and methanol in the presence of a solid catalyst, and introducing phosphoric acid into the reaction mixture in an amount of from 0.01–0.02 mol. per mol. of methanol.

3. A process which comprises reacting a mixture containing carbon monoxide and methanol in the presence of a catalyst containing phosphoric acid in combined form and introducing phosphoric acid into the reaction mixture.

4. A process which comprises reacting a mixture containing carbon monoxide and methanol in the presence of a solid catalyst containing phosphoric acid in combined form and introducing phosphoric acid into the reaction mixture in an amount of from 0.005–0.03 mol. per mol. of methanol.

5. A process which comprises reacting a mixture containing carbon monoxide and methanol in the presence of a silica-phosphoric acid catalyst, and introducing phosphoric acid into the reaction mixture.

6. A process which comprises reacting a mixture containing carbon monoxide and methanol in the presence of a silica-phosphoric acid catalyst, and introducing phosphoric acid into the reaction mixture in an amount of from 0.005–0.03 mol. per mol. of methanol.

7. A process which comprises reacting a mixture containing carbon monoxide and methanol in the presence of a silica-phosphoric acid catalyst at about 200 atmospheres pressure, and an elevated temperature and introducing about .01–.02 mol. phosphoric acid per mol. methanol into the reaction mixture.

8. A process which comprises reacting carbon monoxide and methanol in the presence of a silica-phosphoric acid catalyst while maintaining free phosphoric acid in the reaction zone.

9. A process which comprises passing a mixture of carbon monoxide and methanol in contact with a catalyst to catalyze the reaction of said carbon monoxide and methanol and supplying phosphoric acid to said mixture passing in contact with the catalyst.

10. A process which comprises passing a mixture of carbon monoxide and vapors of methanol in contact with a silica-phosphoric acid catalyst to catalyze the reaction of said carbon monoxide and methanol and supplying phosphoric acid to said mixture passing in contact with the catalyst.

11. A process which comprises preparing a mixture containing carbon monoxide, methanol and phosphoric acid and then passing said mixture in contact with a catalyst to catalyze the reaction of said carbon monoxide and methanol.

12. A process which comprises preparing a mixture containing carbon monoxide, methanol and phosphoric acid and then passing said mixture in contact with a solid catalyst containing phosphoric acid to catalyze the reaction of said carbon monoxide and methanol.

13. A process which comprises preparing a mixture containing carbon monoxide, methanol and phosphoric acid and then passing said mixture in contact with a silica-phosphoric acid catalyst to catalyze the reaction of said carbon monoxide and methanol.

14. A process which comprises preparing a mixture of carbon monoxide, methanol and about .01 to .02 mol. of phosphoric acid per mol. of methanol and passing said mixture at about 200 atmospheres pressure and at an elevated temperature in contact with a silica-phosphoric acid catalyst.

RALPH LYMAN BROWN.